US010252473B2

(12) United States Patent
Nguyen et al.

(10) Patent No.: US 10,252,473 B2
(45) Date of Patent: Apr. 9, 2019

(54) COMPRESSION BAR APPARATUS

(71) Applicant: LG NANOH2O, INC., El Segundo, CA (US)

(72) Inventors: Hoang T. Nguyen, Garden Grove, CA (US); Pouya Dehghani, Los Angeles, CA (US)

(73) Assignee: LG NANOH2O, INC., El Segundo, CA (US)

( * ) Notice: Subject to any disclaimer, the term of this patent is extended or adjusted under 35 U.S.C. 154(b) by 473 days.

(21) Appl. No.: 14/841,240

(22) Filed: Aug. 31, 2015

(65) Prior Publication Data

US 2017/0056833 A1    Mar. 2, 2017

(51) Int. Cl.
| | | |
|---|---|---|
| *B30B 3/00* | (2006.01) |
| *B01D 63/10* | (2006.01) |
| *B01D 65/00* | (2006.01) |
| *B01D 67/00* | (2006.01) |
| *B29C 65/00* | (2006.01) |

(52) U.S. Cl.
CPC ........ *B29C 66/83411* (2013.01); *B01D 63/10* (2013.01); *B01D 63/103* (2013.01); *B01D 65/003* (2013.01); *B01D 67/0086* (2013.01); *B29C 66/8362* (2013.01); *B30B 3/005* (2013.01); *B01D 2313/04* (2013.01); *B01D 2323/42* (2013.01)

(58) Field of Classification Search
CPC ...................... B29C 66/83411; B29C 66/8362
See application file for complete search history.

(56) References Cited

U.S. PATENT DOCUMENTS

| | | | |
|---|---|---|---|
| 4,214,994 A | | 7/1980 | Kitano et al. |
| 4,311,509 A | * | 1/1982 | Reader .................. B65G 39/04 492/40 |
| 4,773,925 A | * | 9/1988 | Schultz ............... C03B 23/0254 65/104 |
| 4,795,559 A | | 1/1989 | Shinjou et al. |
| 4,842,736 A | | 6/1989 | Bray et al. |
| 4,930,202 A | * | 6/1990 | Yano ..................... F16C 13/003 492/27 |
| 5,096,584 A | | 3/1992 | Reddy et al. |
| 5,114,582 A | | 5/1992 | Sandstrom et al. |
| 5,147,541 A | | 9/1992 | McDermott, Jr. et al. |
| 5,435,957 A | | 7/1995 | Degen et al. |
| 5,538,642 A | | 7/1996 | Solie |
| 5,681,467 A | | 10/1997 | Solie et al. |
| 5,919,026 A | | 7/1999 | Appleton |
| 6,156,680 A | | 12/2000 | Goettmann |
| 6,277,282 B1 | | 8/2001 | Kihara et al. |
| 6,881,336 B2 | | 4/2005 | Johnson |
| 7,048,855 B2 | | 5/2006 | De La Cruz |

(Continued)

*Primary Examiner* — Christopher T Schatz
(74) *Attorney, Agent, or Firm* — Dentons US LLP

(57) ABSTRACT

Provided is a compression bar apparatus for applying pressure to desired areas of a thin film composite (TFC) membrane, such as spiral wound TFC membranes and elements, including membranes and elements used for nanofiltration, reverse osmosis or forward osmosis to purify water, such as tap water, seawater, and brackish water. Application of pressure to a spiral wound element by the apparatus produces a membrane with increased sealant penetration, reduced osmotic blistering, and minimal damage to the active area of the membrane. Also provided are methods of using the apparatus.

18 Claims, 11 Drawing Sheets

(56) References Cited

U.S. PATENT DOCUMENTS

| | | |
|---|---|---|
| 8,496,825 B1 | 7/2013 | Jons et al. |
| 2003/0034293 A1 | 2/2003 | Simonetti |
| 2005/0121380 A1 | 6/2005 | De La Cruz |
| 2007/0125492 A1* | 6/2007 | Venkitaraman ......... B29C 55/18 156/291 |
| 2007/0272628 A1 | 11/2007 | Mickols et al. |
| 2008/0295951 A1 | 12/2008 | Hiro et al. |
| 2009/0071592 A1* | 3/2009 | Benson ................. B29C 70/388 156/163 |
| 2010/0006504 A1 | 1/2010 | Odaka et al. |
| 2010/0140161 A1 | 6/2010 | Haynes et al. |
| 2010/0193428 A1 | 8/2010 | Hane et al. |
| 2015/0258759 A1* | 9/2015 | Kim ................... B32B 37/0053 156/60 |

\* cited by examiner

COMPRESSION BAR APPARATUS

FIELD OF THE INVENTION

Provided is a compression bar apparatus for use in applying pressure to the sealant lines of thin film composite (TFC) membranes, such as spiral wound TFC elements, including elements used for nanofiltration, reverse osmosis or forward osmosis to purify water, such as tap water, seawater, and brackish water. Also provided are methods of preventing or eliminating blisters formed during the preparation of spiral wound TFC membrane elements. In particular, provided are methods of increasing the sealant penetration in a membrane or element, eliminate or prevent the formation of blisters on the sealant line, and minimize the damage to the active area of a membrane or element.

BACKGROUND

Spiral wound thin film composite membrane elements are frequently used in reverse osmosis, nanofiltration, ultrafiltration, and microfiltration systems for the purification of tap water, seawater and brackish water, ultra-pure water production, wastewater treatments, and separation of organics from aqueous streams. The membrane of a spiral wound element is usually formed by attaching a flat sheet to a backing material that is typically a non-woven material. The filter membrane (i.e., the flat sheet and the backing material) is then folded around a feed spacer material, typically a polypropylene web, to form an envelope so that the backing material forms the outer surface of the envelope. The backing material is then adhered to a fabric sheet, such as tricot, with an adhesive, or sealant, such as glue. These layers are then wrapped around a permeate outlet tube. Typically, a spiral wound element will have several layers of tricot with a corresponding layer of filter membrane envelope in between.

The purpose of the sealant or adhesive, e.g., glue, is to prevent unfiltered feed fluid from entering the fabric sheet directly through the cross-section of the tricot or of the backing material. Unfiltered feed fluid that enters a filter membrane through the cross-sectional area may become trapped within the membrane or may work its way into the permeate side of the element, such as through the backing material into the fabric material, transporting the permeate to the permeate outlet tube. When the trapped unfiltered feed fluid is a liquid containing dissolved gases, the dissolved gases may come out of solution and expand when a pressure drop occurs, such as at the end of a filtration cycle. This can result in blisters or delamination of the element. Such blisters generally appear on the membrane over the glue line at either end of the element. As filtration continues, more unfiltered feed fluid is fed to the blister, causing further separation of the membrane from the backing until the blister breaks and creates a bypass path through which unfiltered feed fluid may enter the permeate outlet.

Trapped unfiltered feed fluid also can act as a source of permeate fluid contamination, such as by enhancing the growth of bacterial contaminants. Due to the location of the blisters outside of the normal flow path, they cannot be easily sanitized by forcing cleaning agents through the filtration system. The glue line also can be ruptured or damaged by telescoping, an excessive pressure drop from feed to concentrate, or by tearing of the membrane, such as when the permeate pressure exceeds the feed/concentrate pressure by a certain amount at any time. Spiral wound elements can be damaged at glue lines if the pressure on the filtrate side of the membrane exceeds that on the feed side. Factory imperfections such as glue line gaps or potting defects may cause integrity breaches as well.

To prevent blistering in spiral wound elements of thin film composite membranes, techniques have been used that include applying a sealant to the upstream or feed input surface of the membrane material where the potential for blistering exists (see, e.g., U.S. Pat. Pub. No. 2005/0121380) and sealing the pores of the filter membrane with a polymer to prevent an undesired fluid flow path through the filter element (see, e.g., U.S. Pat. Pub. No. 2003/0034293). Although these techniques address the problem of blister formation along the glue lines, they do not increase the glue penetration between the membrane layers. It has been found that increased glue penetration leads to elimination of blisters on the glue lines, consistency of glue line adhesion, and minimization of active area membrane damage.

Thus, there remains a need to develop filtration membranes and elements, including spiral wound reverse osmosis, nanofiltration, ultrafiltration, and microfiltration membranes and elements, that remain free from blisters on the glue lines when used in the purification of water. Also desired are methods for increasing glue penetration through the membrane layers. Accordingly, it is among the objects herein to provide an apparatus and method for applying pressure to the glue lines of spiral wound membranes and elements that prevent or eliminate blisters along the glue lines and minimize damage to the active area of the membrane.

SUMMARY

Provided herein is a compression bar apparatus for applying pressure to the sealant lines of a spiral wound element that contains a bar with a first end, a second end, and a central portion between the first end and second end, where the bar is rotatably mounted to and axially aligned with a lifting component, and the first end and the second end each separately have an outer diameter larger than the outer diameter of the central portion. In some examples, the outer diameter of the first end and the second end are the same and are between 0.25 inches and 1.25 inches larger than the outer diameter of the central portion, and the outer diameter of the central portion is between 0.5 inches and 5 inches. In some examples, the outer diameter of the first end and the second end are the same and are between 1 inch and 6 inches.

The outer diameter of the first end and the outer diameter of the second end can be larger than the outer diameter of the central portion due to the particular construction of the bar. For example, the bar can taper from the central portion towards each of the ends or toward the portions of the bar that is to come into contact with the element. Alternatively, the bar can be made to be a specific diameter at each of the ends (or at the portion of the bar that is to come into contact with the desired object, e.g., the outer edges of a spiral wound element) and at the central portion of the bar. The diameter of the bar can be increased at the portion(s) of the bar that is to come into contact with the desired object by designing a monolithic body or alternatively, by using collars.

In exemplary embodiments, the bar can have a uniform outer diameter but can be equipped with a first collar that fits over the first end of the bar that increases the outer diameter of the first end relative to the outer diameter of the central portion, and a second collar that fits over the second end of the bar that increases the outer diameter of the second end relative to the outer diameter of the central portion. The first collar and second collar can be hollow cylinders having uniform thickness and can have rounded edges. For example, the first collar and second collar each can have a thickness of between 0.1 inches and 2 inches. In some examples, the outer diameter of the first end and the outer diameter of the second end are the same and are between 0.25 inches and 1.25 inches larger than the outer diameter of the central portion. In some examples, the outer diameter of the central portion is between 0.5 inches and 5 inches. In some examples, the outer diameter of the first end and the second end are the same and are between 1 inch and 6 inches.

In exemplary embodiments, the first collar and the second collar each have a width, i.e., the amount of the collar that covers the first end and second end, respectively, of between 0.25% and 7.5% of the total length of the bar. In some examples, the width of the first collar and the width of the second collar are the same. The width of the first collar and the second collar can be between 0.1 inches and 3 inches. In some examples, the length of the bar is between 40 inches and 43 inches. The bar can be tubular. In exemplary embodiments, the bar can be made of a rigid material. Exemplary materials include synthetic plastic polymers, metal, or combinations thereof.

In exemplary embodiments, the apparatus can further include a connector for connecting the first end and the second end to the lifting components to allow rotation of the bar. The lifting components can include a rod, a piston, and a cylinder, such as a pneumatic cylinder, for example, a pneumatic cylinder that is pneumatically coupled to an air source.

The apparatus provided herein can be movably mounted or attached to a fixed object, such as a frame, a table, or combination thereof. The apparatus can be movably mounted or attached to the fixed object through the lifting components.

Also provided herein are methods of applying pressure to the sealant lines of a spiral wound element to prevent osmotic blistering and increase sealant penetration in a spiral wound element. The methods include providing a compression bar apparatus that includes a bar having a first end, a second end, and a central portion between the first end and second end, where the bar is rotatably mounted to and axially aligned with a lifting component, and the first end and the second end each have an outer diameter larger than the outer diameter of the central portion; positioning a spiral wound element parallel to the bar, where the outer edges of the membrane are sealed with a sealant to form sealant lines; moving the bar with the lifting component towards the membrane to bring the first end and second end of the bar in contact with the sealant lines of the membrane; and rotating the apparatus, the membrane, or both, along the x-axis to apply uniform pressure to the outer edges of the membrane by the first end and second end of the bar, where no contact occurs between the central portion of the bar and the active area of the membrane. The resulting spiral wound element has increased sealant penetration through the membrane layers and less damage to the active area of the membrane as compared to a spiral wound element produced using a compression bar apparatus that applies pressure to the entire membrane. In some methods, the sealant is glue. In some embodiments, the method further includes providing a spiral wound element with a diameter between 7 inches and 8 inches and applying between 30 psi and 45 psi pressure.

In exemplary embodiments, the method can include fitting a first collar over the first end of the bar, thus increasing the outer diameter of the first end relative to the outer diameter of the central portion, and fitting a second collar over the second end of the bar, thereby increasing the outer diameter of the second end relative to the outer diameter of the central portion. The first collar and second collar can be hollow cylinders having uniform thickness. In some methods, the first collar has a width that is 4.5% to 5% of the total length of the bar and extends 1 inch from the sealant line toward the active area of the membrane when the bar and spiral wound element are brought into contact, and the second collar has a width that is 4.5% to 5% of the total length of the bar and extends 1 inch from the sealant line toward the active area of the membrane when the bar and spiral wound element are brought into contact.

In exemplary embodiments, the method includes movably mounting or attaching the apparatus to a fixed object, including a frame, a table, or combination thereof. The apparatus can be moved by pneumatic pressure.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. The drawings described herein are for illustrative purposes only of selected embodiments and not all possible implementations, and are not intended to limit the scope of the present disclosure.

FIG. 5 depicts a collar that can be fit over a portion of the roller bar described herein to increase the diameter of the bar at a desired region(s).

FIG. 6A shows the compression bar apparatus in a lowered position, where there is no contact between the compression bar apparatus and the spiral wound element. FIG. 6B shows the compression bar apparatus in a raised position, where contact occurs between the end portions of the roller bar and the edges of the spiral wound element while there is no contact between the central portion of the roller bar and the active area of the membrane.

FIGS. 7A and 7B show the presence of osmotic blistering along the sealant lines of a membrane due to application of insufficient pressure by a compression bar apparatus known in the prior art. FIG. 7C shows a membrane with damage (spacer marks) to the active area of the membrane due to the application of excessive pressure by a compression bar apparatus known in the prior art. FIG. 7D shows a membrane after application of pressure by a compression bar apparatus according to the description provided herein. The membrane does not exhibit osmotic blistering or damage (spacer marks) to the active area of the membrane.

DETAILED DESCRIPTION

A. Definitions

Figure 1:
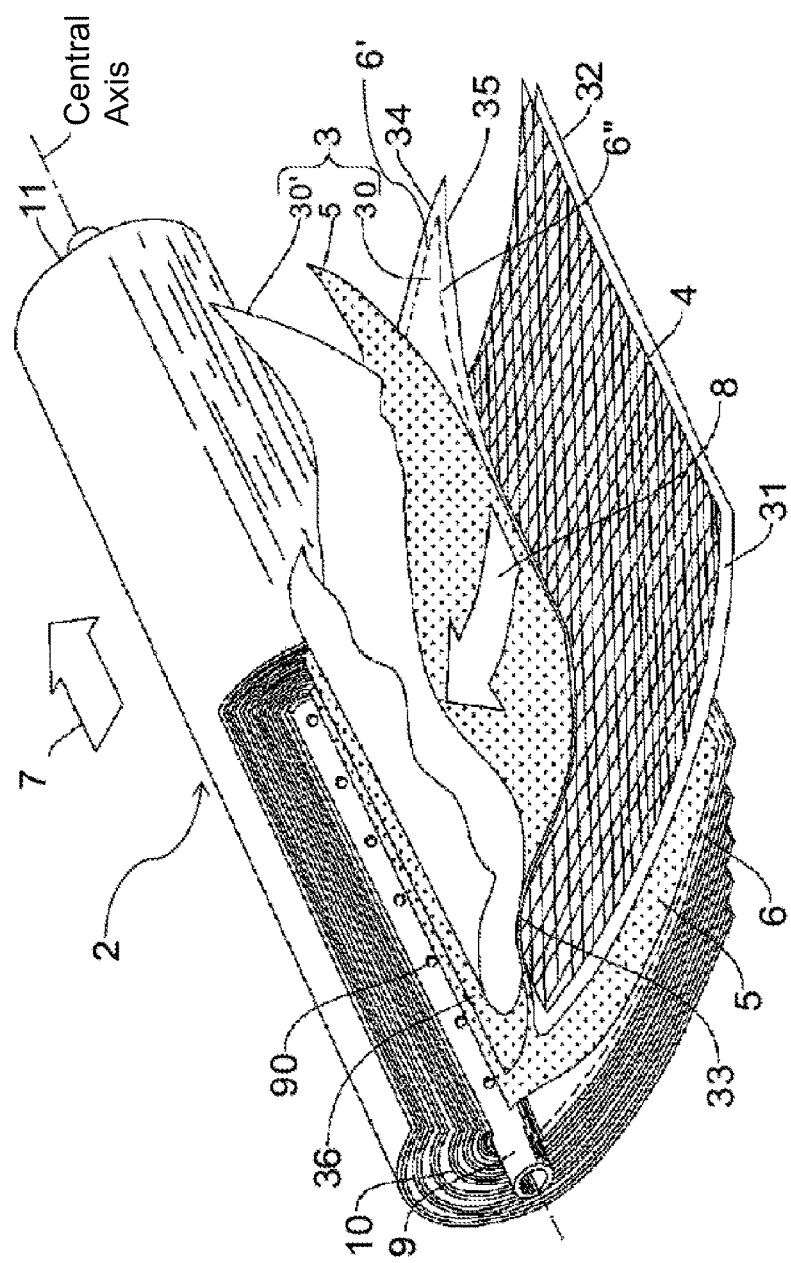
FIG. 1 is a perspective, partially cut-away view of a spiral wound element.

Unless defined otherwise, all technical and scientific terms used herein have the same meaning as is commonly understood by one of skill in the art to which the inventions belong. All patents, patent applications, published applications and publications, websites and other published materials referred to throughout the entire disclosure herein, unless noted otherwise, are incorporated by reference in their entirety. In the event that there are a plurality of definitions for terms herein, those in this section prevail. Where reference is made to a URL or other such identifier or address, it is understood that such identifiers can change and particular information on the internet can come and go, but equivalent information can be found by searching the internet. Reference thereto evidences the availability and public dissemination of such information.

As used herein, the singular forms "a," "an" and "the" include plural referents unless the context clearly dictates otherwise.

As used herein, ranges and amounts can be expressed as "about" a particular value or range. "About" also includes the exact amount. Hence "about 5 percent" means "about 5 percent" and also "5 percent." "About" means within typical experimental error for the application or purpose intended.

As used herein, "optional" or "optionally" means that the subsequently described event or circumstance does or does not occur, and that the description includes instances where said event or circumstance occurs and instances where it does not. For example, an optional component in a system means that the component may be present or may not be present in the system.

As used herein, a "thin film composite membrane" refers to a membrane that has layers of dissimilar materials joined together to form a single membrane.

As used herein, a "spiral wound element" refers to one or more thin film composite membrane sheets and optional feed channel spacer sheets assembled and wound around a central permeate collection tube. The spiral wound element can then be encased in a hard shell with an anti-telescoping device or end cap at each end as discussed, for example, in U.S. Pat. No. 8,496,825, for use as a water filtration device.

As used herein, "active area," "active membrane area" or "active area of the membrane" refer to the actual area of useful membrane surface area of a thin film composite membrane. The active area is the available surface area of the membrane within an individual element through which permeate can pass. The active area of the membrane does not include membrane area lost during the construction of an element, for example, the area of the membrane covered by adhesive or sealant.

B. Spiral Wound Membranes and Elements

Provided herein is a compression bar apparatus that can be used in the preparation of spiral wound membranes and elements. In the preparation of reverse osmosis filtration membranes and elements, such as spiral wound membranes and elements, a sealant or adhesive, e.g., glue, can be applied along the edges of the membranes to seal the leaves of the membrane against unfiltered feed fluid entering the membrane through the cross-section of the tricot or the backing material. The compression bar apparatus described herein can be used in conjunction with a spiral wound element to seal the leaves of the membrane and increase penetration of the adhesive or sealant through the membrane layers. For example, the compression bar apparatus described herein can be used to apply pressure to the areas of a spiral wound membrane or element where adhesive or sealant has been applied, e.g., along the sealant or adhesive, e.g., glue, lines, without damaging the active area of the membrane. In some embodiments, the sealant or adhesive, e.g., glue, lines can be located along the outer edges of the membrane leaves. Use of the compression bar apparatus described herein to apply pressure to the adhesive lines of spiral wound membranes and elements results in membranes and elements that are free from blisters along the adhesive, e.g., glue, lines, have increased adhesive, e.g., glue, penetration through the membrane layers, and have minimal damage to the active area of the membranes.

1. Spiral Wound Elements

A spiral wound element can be formed by wrapping one or more membrane envelopes and feed spacer sheets concentrically about a central permeate collection tube. The envelopes can contain two generally rectangular membrane sheets that sandwich therebetween a porous permeate carrier material, such as a polyester fibrous sheet material. The envelopes can be sealed or held together by a sealant or adhesive along three edges, although other means exist to seal the three envelope edges. The fourth edge of the envelope is axially aligned along the permeate collection tube such that the membrane envelope is in fluid communication with the permeate collection tube, but is otherwise sealed from feed fluid passing across the outer surface of the membrane envelope. Each envelope can be separated by a feed spacer sheet that also is wound about the collection tube. The feed spacer is in fluid contact with both ends of the element and acts as a conduit for feed solution across the front surface of the membrane. The construction of spiral wound elements also is described in, e.g., U.S. Pat. Nos. 5,538,642 and 5,681,467, the disclosures of each of which are incorporated herein by reference.

FIG. 1 illustrates an exemplary embodiment of a spiral wound element for reverse osmosis that can be placed in contact with the compression bar apparatus described herein to increase the sealant penetration between membrane layers and to prevent or eliminate blisters and delamination of the membrane. The element 2 is shown partially unwound and a partially assembled membrane is shown for clarity. Other exemplary spiral wound elements suitable for use with the apparatus and methods described herein include those described in U.S. Pat. Nos. 4,842,736; 5,096,584; 5,114,582; 5,147,541; 5,538,642; 5,681,467; 6,277,282; 6,881,336; and 8,496,825; and U.S. Pat. Pub. Nos. US 2007/0272628 and US 2008/0295951, the disclosures of each of which are incorporated herein by reference.

The arrows shown in FIG. 1 represent the approximate directions of the fluid flow paths of feed fluid 7 and permeate fluid 8 during operation. Feed fluid enters the element 2 from inlet scroll face 10 and flows across the front side 31 of the membrane sheet (30, 30') and exits the element 2 at opposing outlet scroll face 11. Permeate fluid flows along permeate spacer sheet 5 in a direction approximately perpendicular to the feed flow as indicated by arrow 8, though actual fluid flow paths can vary depending on the construction of the element and operating conditions.

The spiral wound element 2 shown in FIG. 1 can be formed by concentrically winding one or more membrane envelopes 3 and optional feed channel spacer sheets 4 about a permeate collection tube 9. Each membrane envelope 3 can be made up of two substantially rectangular sections of membrane sheet 30 and 30', each of which can have a semi-permeable membrane layer or front side 31 and support layer or back side 32. The membrane envelope 3 can be formed by overlaying and aligning the edges of membrane sheets 30 and 30'. The membrane sheets 30 and 30' can surround a permeate channel spacer sheet 5. An envelope can be formed by securing together along the three edges 33, 34 and 35 with, for example, a sealant to form sealant lines (6, 6', 6", respectively), while a fourth edge 36 abuts the permeate collection tube 9 so that the inside portion of the envelope 3 is in fluid communication with a plurality of openings 90 that extend along the length of the permeate collection tube 9.

The membrane sheet can include at least one semi-permeable membrane layer 31 (front side) and a support layer 32 (back side) in planer arrangement with each other to form a composite structure. The support layer 32 is not particularly limited but preferably is made up of a non-woven fabric or fibrous web mat. Alternatively, a woven fabric, for example, sail cloth, may be used. Suitable support layers can include those described in U.S. Pat. Nos. 4,214,994; 4,795,559; 5,435,957; 5,919,026; 6,156,680; and 7,048,855; and U.S. Pat. Pub. Nos. 2008/0295951 and 2010/0193428, the disclosures of each of which are incorporated herein by reference. In some embodiments, the support layer can be provided as a roll of sheet material upon which a membrane layer is applied. The support layer can include a microporous polymer support that may be cast upon the non-woven fabric or fibrous web mat that can be about 25-125 microns in thickness. Exemplary of suitable microporous supports include those made of, for example, polysulfone, polyether sulfone, polyimide, polyamide, polyetherimide, polyacrylonitrile, poly(methyl methacrylate), polyethylene, polypropylene, and various halogenated polymers such as polyvinylidene fluoride.

Permeate tube 9 is a perforated central tube that collects permeate from the spacer materials inside the element 2. The material of permeate tube 9 is not limited and can be any material that is resistant to corrosion to the fluid being filtered. In exemplary embodiments, permeate tube 9 can be made of polyvinyl chloride (PVC). Other materials that can be used include metals, polymers, ceramics, or combinations thereof. Additional exemplary materials that can be used to form the permeate tube 9 include plastic materials, such as acrylonitrile-butadiene-styrene, polysulfone, poly(phenylene oxide), polystyrene, polypropylene, polyethylene, or the like. Tubes for standard elements of 40-inch length are usually extruded. Secondary machining operations add side-holes and tightly-toleranced sealing surfaces. Tubes for shorter elements are sometimes injection-molded. Although most tubes for 8-inch diameter elements have inside diameters near 2.5 cm, a large-diameter tube has been offered in commercially available low-energy brackish water and nanofiltration elements. The 3.5 cm inside diameter reduces pressure drop, which is a significant contributor to unwanted permeate backpressure in low-pressure reverse osmosis systems. The size and arrangement of the perforations 90 can be arranged in any manner desirable as long as they allow for the filtered fluid to flow into the permeate tube 9.

In some embodiments, the spiral wound element 2 can contain a plurality of membrane envelopes 3 that are separated by a plurality of feed channel spacer sheets 4. Membrane envelopes 3 can be formed by joining the back side surfaces 32 of adjacent membrane leaf packets, such as, for example, the membrane leaf packets described in U.S. Pat. Nos. 4,842,736 and 5,147,541, and U.S. Pat. Pub. No. 2010/0140161, the disclosures of each of which are incorporated herein by reference. For example, a membrane leaf packet can contain a substantially rectangular membrane sheet 30 folded upon itself to define two membrane leaves such that the front sides 31 are facing each other and the fold is axially aligned with the proximal edge 36 of the membrane envelope 3, so that the edge 36 is parallel with the permeate collection tube 9. A feed channel spacer sheet 4 is positioned between facing front sides 31 of the folded membrane sheet 30. Though not shown in FIG. 1, additional intermediate layers also can be included in the element.

The feed channel spacer sheet 4 can be fitted between layers of folded permeable membrane sheet 30. The primary purpose of the feed channel spacer 4 is to create a space for the feed fluid to flow in an axial direction through the element, i.e., parallel with the permeate collection tube 9, between adjacent permeable membrane envelopes 3 and to create turbulence on the surfaces of the membranes. Feed spacer membranes can be made of a sheet of plastic mesh or netting, e.g., polypropylene, polyethylene, or polyester mesh or netting. Other exemplary feed spacer membranes include those described in U.S. Pat. No. 6,881,336, the disclosure of which is incorporated herein by reference. For example, a common feed spacer configuration used in reverse osmosis membrane elements is the biplanar extruded net, a continuous, cylindrical mesh structure made up of two intersecting sets of parallel, extruded strands to form a flat web. Typically, thicknesses of feed channel spacer 3 is between, for example, 0.6 mm and 0.9 mm.

2. Manufacture of the Spiral Wound Element

During construction of the element 2, shown in FIG. 1, permeate channel spacer sheets 5 can be attached about the circumference of the permeate collection tube 9 with membrane leaf packets 3 interleaved therebetween. The back sides 32 of adjacently positioned membrane leaves 30 and 30' can be sealed along edges 33, 34 and 35 to enclose the permeate channel spacer sheet 5 to form a membrane envelope 3. The permeate channel spacer sheet 5 can be positioned within the membrane envelope such that the permeate sheet extends from the proximal edge of the membrane envelope prior to winding the envelope about the permeate collection tube 9. Permeate channel spacer sheet 5 can be made of polyester material, for example, a tricot polyester material. Suitable permeate spacers include those described in U.S. Pat. Pub. No. 2010/0006504, the disclosure of which is incorporated herein by reference. One or more membrane envelopes 3 and feed channel spacers 4 can then be wound or rolled concentrically about the permeate collection tube 9 to form a first and second scroll face 10 and 11 at opposing ends of tube 9. The resulting spiral bundle, i.e., element, can be secured, for example, by tape or other means.

In a typical process, the edges of membrane sheets 30 and 30' and permeate channel spacer sheet 5 can be sealed together to form a membrane envelope 3 by laying one membrane sheet horizontally on a table and placing a permeate channel spacer sheet on it. Sealant, for example, an adhesive, e.g., glue, can be applied in lines down the two side edges (33 and 34) and the leaf tip edge (35) of the permeate channel spacer sheet to form sealant lines 6, 6' and 6", respectively. Another membrane sheet is laid over the permeate channel spacer sheet to complete the leaf. The edges of the leaf can be compressed while still resting on the table. Application of the sealant, e.g., glue, can be manual or can be automated. The leaf also can be compressed by the tension applied while the leaf is wound around the central permeate collection tube. The sealant spreads from its initial location as the leaf is compressed. Sealant spreading inwards reduces the active membrane area. The width of the sealant lines (6, 6', 6"), i.e., sealant spread, can vary between, for example, about 1 inch with automatic sealant application and about 1.75 inches with manual sealant application.

The sealant or adhesive used to seal edges 33, 34 and 35 along sealant lines 6, 6', and 6", respectively, of the membrane envelope 3 can be chosen so that it permits relative movement of the various sheet materials during the winding process, for example, a sealant can be chosen that has a cure rate or period of time before which the sealant becomes tacky, that is longer than the time required to assemble and wind the membrane envelopes 3 about the permeate collection tube 9. Sealants are well known in the art. Suitable sealants for sealing membrane envelopes can include, for example, urethanes, epoxies, silicones, acrylates, hot melt adhesives and UV curable adhesives. The sealant or adhesive can be chosen based on its properties. For example, the sealant can be a glue and can be chosen based on its viscosity. The adhesive, e.g., glue, can have a viscosity at 77° F., for example, between about 10,000 centipoise (cP) and about 30,000 cP, such as between about 14,000 cP and about 23,500 cP, or between about 14,000 cP and about 19,000 cP, or between about 17,500 cP and about 23,5000, such as about 10,000, 11,000, 12,000, 13,000, 14,000, 15,000, 16,000, 17,000, 17,500, 18,000, 19,000, 20,000, 21,000, 22,000, 23,000, 24,000, 25,000, 26,000, 27,000, 28,000, 29,000, or 30,000 cP. Other sealing means also can be used, including, for example, application of heat, pressure, ultrasonic welding and/or tape. In some embodiments, the sealant can be an adhesive, such as a polyurethane adhesive. The adhesive can be a single component adhesive or can be a blend of two or more components. In an exemplary embodiment, the adhesive is a blend of two components. Suitable polyurethane adhesives include those that exhibit excellent adhesion to wet and dry reverse osmosis membranes, resistance to acidic and basic solutions, and have good tensile and elongation properties. Exemplary of a polyurethane adhesive includes a polyurethane adhesive that is a blend of two components with a viscosity at 77° F. of between about 17,500 cP and about 23,500 cP, such as the polyurethane adhesive that is sold by H.B. Fuller (Product No. UR3543; St. Paul, Minn.).

Membranes sealed and compressed by methods known in the art, for example, by applying a sealant, e.g., adhesive, to the membrane sheets, followed by applying pressure across the entire surface of the membrane, including the active area of the membrane, to promote adhesion of the sealant, for example, by using a bar or roller, such as those in the prior art, often exhibit increased osmotic blistering, non-consistent adhesion of sealant lines, and insufficient sealant penetration between membrane layers. Osmotic blistering is the formation of large blisters on the sealant lines that is due to liquid accumulation between the impermeable sealant, e.g., glue, and the membrane when liquid finds passage through portions of the porous medium that have not been fully sealed by sealant. Use of a bar or roller that applies pressure across the entire surface of the membrane, including the active area of the membrane, also frequently results in damage to the active area of the membrane due to the contact and pressure applied to the entire surface of the membrane rather than only along the sealant lines around the edge of the membrane. As shown herein, the compression bar apparatus described herein solves these problems, resulting in membranes and elements with increased sealant, e.g., glue, penetration, elimination of blisters on the sealant lines, sealant line adhesion consistency, and minimization of damage to the active area of the membrane.

Figure 2:
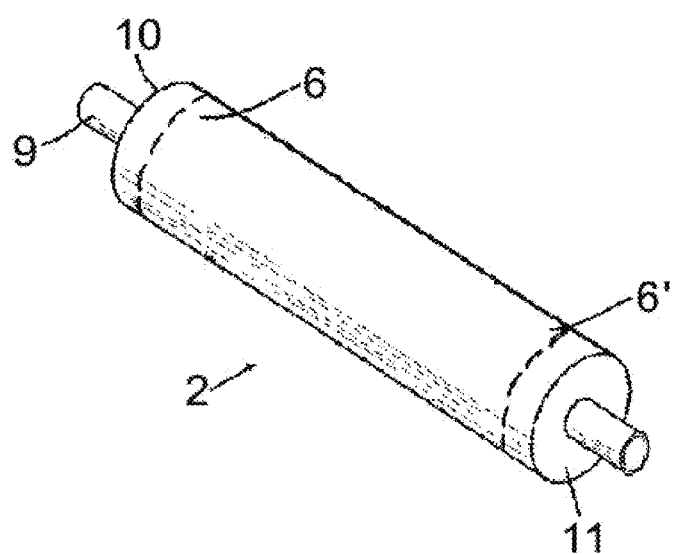
FIG. 2 is a perspective view of a spiral wound element.

FIG. 2 illustrates a spiral would element 2 after the individual membrane envelopes and feed channel spacer sheets have been assembled and wound around the central permeate collection tube 9. Application of sealant along edges 33 and 34 (not shown) results in sealant lines 6 and 6'. Sealant lines 6 and 6' are located along the side edges of the wound membranes on the interior portions of the membrane envelopes. Sealant can be applied to the membranes as discussed above in regard to FIG. 1. As shown in FIG. 2, after the membrane envelopes and spacer sheets are wound around the central permeate collection tube 9, sealant lines 6 and 6' (and 6", not shown) from each membrane envelope can be aligned. The sealant lines 6 and 6' (and 6", not shown) can be located any distance from the edge of the membrane, such as, for example, between about 0.5 inches and 2 inches, or between about 1 inch and 1.5 inches, for example, about 0.5, 0.6, 0.7, 0.8, 0.9, 1, 1.1, 1.125, 1.2, 1.25, 1.3, 1.4, 1.5, 1.6, 1.7, 1.75, 1.8, 1.9, or 2 inches from the edge of the membrane. In an exemplary embodiment, the sealant lines (6, 6' and 6", not shown) are located between about 1 inch and 1.25 inches from each outer edge of the membrane, or about 1.125 inches from each outer edge of the membrane. Typically, the sealant lines are located a sufficient distance from the outer edges of the membrane to allow the sealant to spread.

C. Compression Bar Apparatus

It has been found that the compression bar apparatus described herein can be used to increase the penetration of sealant, e.g., glue, between the membrane leaves and envelopes of a spiral wound element to eliminate blisters along the sealant lines, increase sealant line adhesion consistency, and minimize damage to the active area of the membrane, such as damage caused by bars or rollers known in the art. The compression bar apparatus described herein allows for increased compression on the sealant line regions of the element by increasing the diameter of the compression bar at the portion(s) of the bar that is to come into contact with and apply pressure to the sealant lines as compared to the portion(s) of the bar that is not to apply pressure to the sealant lines, i.e., the portion(s) of the bar that does not come into contact with the element.

The compression bar apparatus described herein can include any type of bar, for example, the bar can be cylindrical or tubular in shape. Alternatively, the bar can be cylindrical or tubular in shape only at the portion(s) of the bar that is to come into contact with the element, for example, along the sealant lines of the element. The outer diameter of the bar can be increased at each end of the bar, where "end" refers to each of the terminal portions of the bar. The ends (or end portions) are distinct from the central portion of bar in that the ends can have an increased diameter as compared to the diameter of central portion of the bar such that the ends can come into contact with the element, for example, along the sealant lines, while the central portion of the bar cannot.

In exemplary embodiments, the compression bar apparatus can be used to apply pressure to a select area(s) of a spiral wound element along the edges of the element, owing to the increased outer diameter at the end portions of the bar as compared to the outer diameter at the central portion of the bar. Due to the increased diameter only at certain portions of the bar, contact between the compression bar apparatus and the element is restricted to only the region(s) of the bar with the increased diameter. For example, contact between the compression bar apparatus and the element can be restricted to the end portions of the bar with the increased outer diameter and the edges of the element. Thus, the central portion of the bar is left free from contact with the element.

While the description herein refers to particular embodiments of the present invention in the context of spiral wound filter elements, it will be understood by a person of ordinary skill in the art that the products and processes of the present invention can be used with other types of filter elements in which increased sealant, e.g., glue, penetration is desired, reduced osmotic blistering is desired, and/or reduced membrane damage is desired. The presently disclosed embodiments are, therefore, to be considered in all respects as illustrative and not restrictive.

The bar of the compression bar apparatus described herein can be any diameter and length that allows only the desired portions of the bar, e.g., the portions of the bar with increased diameter, to contact the surface of the desired object, e.g., spiral wound element. In exemplary embodiments, the end portions of the bar can come into contact with the surface of the desired object, e.g., the outer edges of a spiral wound element, while the central portion of the apparatus, i.e., the portion of the apparatus in between the end portions of the apparatus, does not come into contact with the object. The bar can be of tubular construction. This design is not limited, however. In preferred embodiments, the bar can be tubular at least where it is to contact the element. For example, the bar can be made tubular only at the ends. It also is to be understood that the bar can be tapered. For example, the bar can taper from the central portion towards the ends or the portion(s) of the bar that is to come into contact with the element. Alternatively, the bar can be constructed so as to be of a specific outer diameter at each of the ends and a different outer diameter at the central portion, or at the portion(s) of the bar that is to come into contact with the desired object. The compression bar apparatus described herein can be made so that the central portion of the bar has an outer diameter that is less than the outer diameter of the portion(s) of the bar that is to come into contact with the element. For example, each end portion of the bar can have an outer diameter that is larger than the outer diameter of the central portion of the bar. In such embodiments, when the compression bar apparatus is placed in contact with a surface, such as the surface of a spiral wound element, the portion(s) of the bar with increased diameter, e.g., the end portions, come into contact with the outer edges of the spiral wound element and the central portion of the bar does not, i.e., there is space between the central portion of the bar and the surface of the object (e.g., element) so that no contact occurs between the central portion of the bar and the object.

Increasing the diameter of the bar only at the portion(s) of the bar that is to come into contact with the desired object, e.g., the first and second end portions, can be achieved by designing a monolithic body to have a varying outer diameter along its length, or alternatively, by using collars. In a monolithic embodiment, the outer diameter may vary gradually, as in a tapered fashion. Alternatively, the outer diameter may be varied in a step-like manner only where the larger outer diameter is desired. A similar step-like design can be obtained by adding collars to a bar that would otherwise have a uniform outer diameter along its length. For purposes of the description herein, reference is made to collars, but it will be understood by a person of ordinary skill in the art that some concepts are applicable to other designs. Thus, the description with respect to collars is to be considered illustrative and not limiting.

Figure 3:
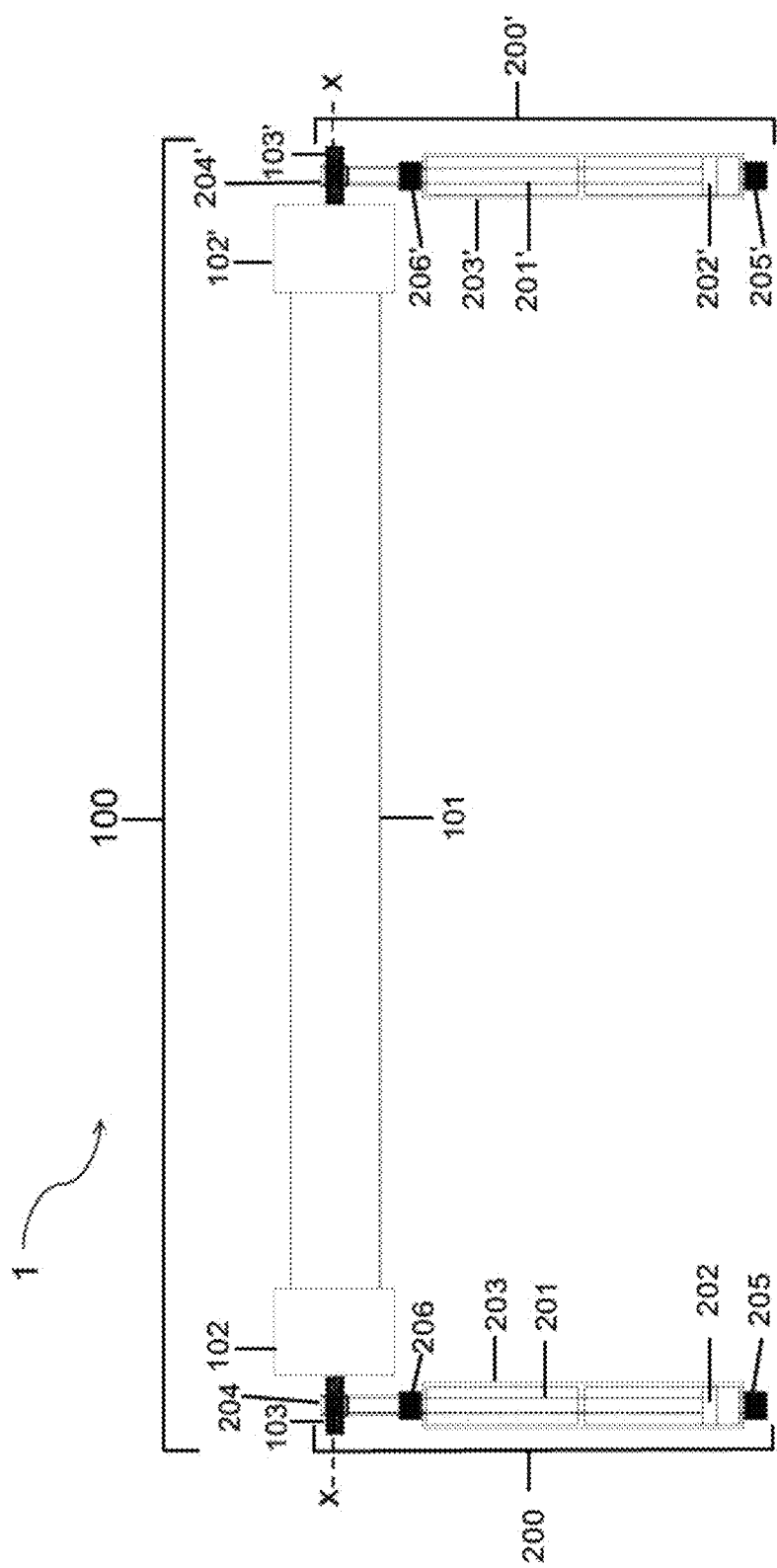
FIG. 3 is a front elevation view of a compression bar apparatus according to the description provided herein.

FIG. 3 illustrates an embodiment of the compression bar apparatus described herein. The compression bar apparatus 1 described herein generally contains a roller bar 100 and two identical lifting components 200 and 200'. The roller bar 100 can include a bar 101, two identical collars 102 and 102', and a core 103.

As shown in FIG. 3, bar 101 can be a cylindrical tube. Bar 101 can be made of any material of suitable strength for applying the desired amount of pressure to the desired object, for example, a spiral wound element. In some embodiments, bar 101 can be made of metal, for example, stainless steel. Other appropriate materials include, but are not limited to, aluminum and high density plastic, e.g., high-density polyethylene (HDPE). Bar 101 can have an outer diameter that changes along the length of bar 101, such as an outer diameter that is tapered from the center towards the ends, for example, an outer diameter that is smaller towards the central portion of bar 101 and larger at each of the end portions of bar 101. Alternatively, bar 101 can have an outer diameter that is constant across the entire length of bar 101, i.e., the outer diameter at each of the end portions is the same as the outer diameter of the central portion. In exemplary embodiments, where the outer diameter of bar 101 is constant across the entire length of bar 101, collars, e.g., collars 102 and 102', can be fitted over a portion(s) of bar 101 to increase the outer diameter of that portion. In some embodiments, bar 101 can have a constant diameter along the entire length of the bar, i.e., the outer diameter at each of the end portions is the same as the outer diameter at the central portion, such as an outer diameter at the central portion of between about 0.5 inches and about 5 inches, for example, between about 2 inches and about 4 inches, such as about 3 inches, e.g., an outer diameter of about 0.5, 0.75, 1, 1.25, 1.5, 1.75, 2, 2.25, 2.5, 2.75, 3, 3.25, 3.5, 3.75, 4, 4.25, 4.5, 4.75, or 5 inches, but can be smaller or larger depending on the desired application. In one embodiment, the diameter of bar 101 is the same at each of the end portions as at the central portion (i.e., the diameter is constant across the entire length of bar 101) and is about 3 inches.

In some embodiments, bar 101 has an outer diameter at the central portion that is smaller than the outer diameter at the end portions. For example, the outer diameter at the central portion of bar 101 can be between about 0.25 inches and about 2 inches smaller than the outer diameter at each of the end portions of bar 101, such as between about 0.5 inches and about 2 inches smaller, or between about 0.5 inches and about 1.5 inches smaller, such as about 0.25, 0.5, 0.75, 1, 1.25, 1.5, 1.75, 2, 2.25, 2.5, 2.75, or 3 inches smaller. In one embodiment, the outer diameter at the central portion of bar 101 is about 1 inch smaller than the outer diameter at each of the end portions of bar 101.

Bar 101 can be hollow or can be solid. In some embodiments, bar 101 is solid and is attached to means that connect the roller bar 100 to lifting components 200 and 200'. In some embodiments, bar 101 is hollow and encloses a cylindrical core 103. Typically, core 103 has an outer diameter that is less than the outer diameter of bar 101. For example, the core 103 can have an outer diameter of between about 0.25 inches and 1 inch, such as about 0.25, 0.3, 0.4, 0.5, 0.6, 0.625, 0.7, 0.75, 0.8, 0.9, or 1 inch. Core 103 is typically centered in bar 101 and extends the length of bar 101 and outwards from each end of bar 101 an additional distance. The distance typically is sufficient to allow core 103 to extend out of bar 101 to permit core 103 to connect to lifting components 200 and 200'. For example, core 103 can extend an additional distance outward from each end of bar 101 between about 1 inch and 3 inches, such as about 2 inches, for example, about 1, 1.1, 1.2, 1.25, 1.3, 1.4, 1.5, 1.6, 1.7, 1.75, 1.8, 1.9, 2, 2.1, 2.2, 2.25, 2.3, 2.4, 2.5, 2.6, 2.7, 2.75, 2.8, 2.9, or 3 inches. The core 103 can be made of any material that is sufficiently rigid, for example, stainless steel or steel.

Figure 4:
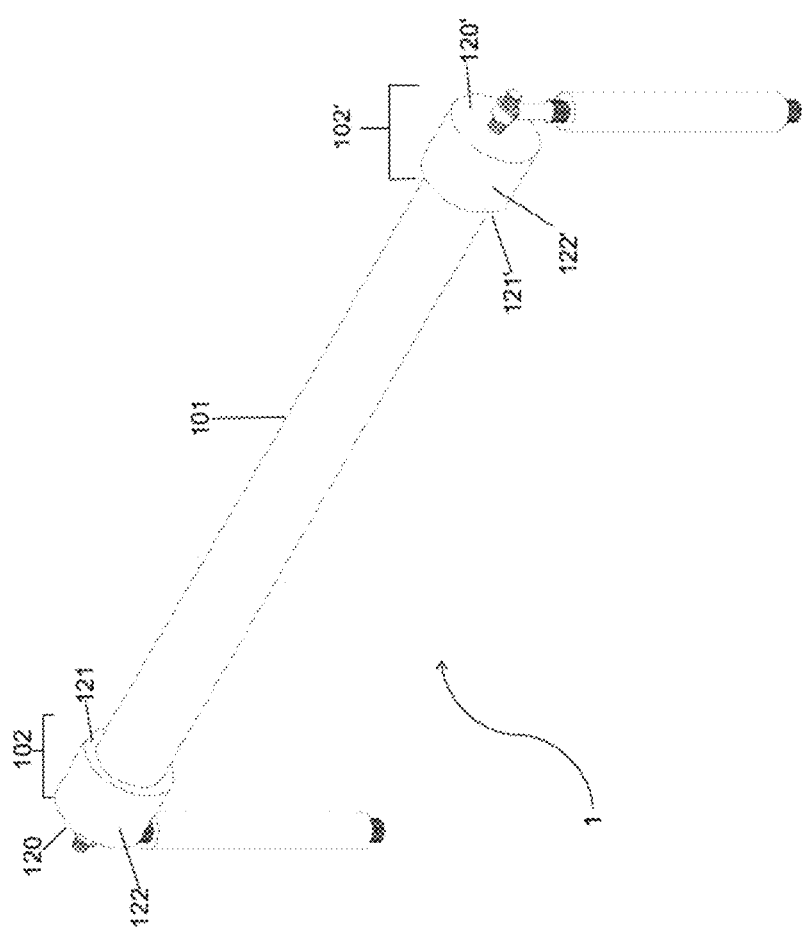
FIG. 4 is an isometric view of a compression bar apparatus according to the description provided herein.
Figure 5:
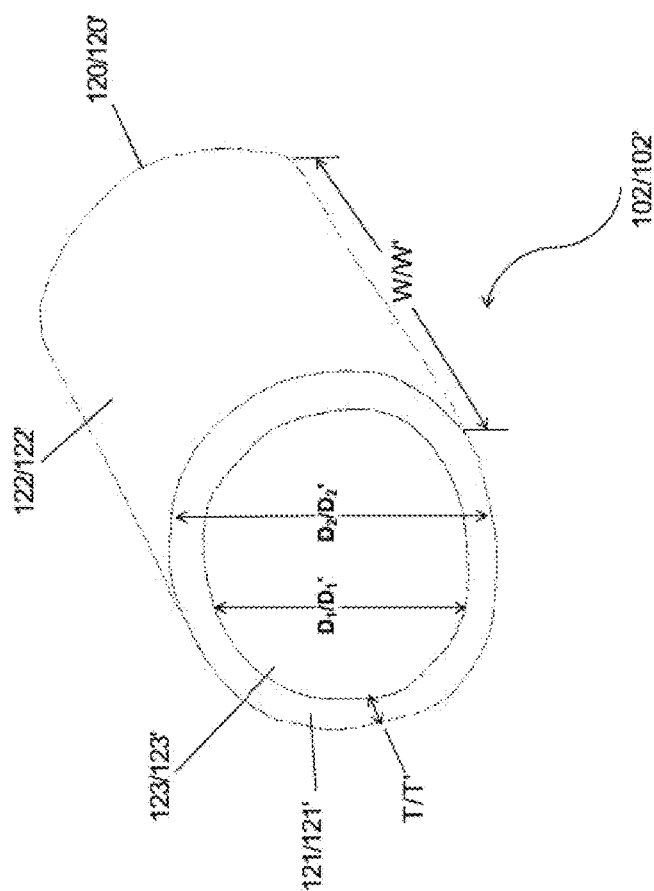
FIG. 5 is a perspective view of an element of the present invention.

In exemplary embodiments, the roller bar 100 can include collars 102 and 102'. Collars 102 and 102' each can be fit over a portion of bar 101 to effectively increase the outer diameter of bar 101 at the respective region. In an exemplary embodiment, collars 102 and 102' each can fit over an end portion of bar 101 and serve to effectively increase the outer diameter of each end portion of bar 101 as compared to the outer diameter of the central portion of bar 101. The bar 101 can be fitted with collars 102 and 102' when bar 101 has a constant outer diameter along the entire length of the bar 101 (i.e., the outer diameter of each end portion of bar 101 is the same as the outer diameter of the central portion of bar 101) and it is desired to effectively increase the outer diameter of the bar 101 at a desired region(s), for example, at the region(s) where the compression bar apparatus is to come into contact with the desired object, e.g., a spiral wound element. As shown in FIG. 4 and FIG. 5, each collar (102, 102') can be a hollow cylinder, i.e., ring, with an inside facing edge (121, 121'), an outside facing edge (120, 120'), an inner surface (123, 123') that can come into contact with the outer surface of bar 101, and an outer surface (122, 122'). The outer surface (122, 122') of each collar (102, 102') can come into contact with and apply pressure to (i.e., compress) the desired object, e.g., a spiral wound element. In exemplary embodiments, the collars (102, 102') can have rounded edges (121, 121') so as to avoid damage to the membrane, e.g., the active area of the membrane.

As shown in FIG. 5, each collar (102, 102') has an inner diameter ($D_1$, $D_{1'}$) and an outer diameter ($D_2$, $D_{2'}$) defined by the inner surface (123, 123') and outer surface (122, 122'), respectively, where the distance between the inner diameter ($D_1$, $D_1$') and the outer diameter ($D_2$, $D_2$') is the thickness (T, T') of the collar (102, 102'). The inner diameter ($D_1$, $D_{1'}$) is typically of a size that allows collars 102 and 102' to fit over each end of the bar 101, leaving a sufficient amount of clearance between the bar 101 and the inner surface (123, 123') so that the bar 101 can fit tightly inside the opening, allowing the inside facing edge (121, 121') to be in contact with the surface of the bar 101. For example, the inner diameter ($D_1$, $D_{1'}$) can be slightly greater than the outer diameter of the bar 101, such as, e.g., about 0.001 inches, 0.002 inches, 0.003 inches, 0.004 inches, 0.005 inches, or greater, than the outer diameter of the bar 101. In some embodiments, the bar 101 has an outer diameter of about 3 inches and the inner diameter ($D_1$, $D_{1'}$) of each collar (102, 102') is about 0.001 inches, 0.002 inches, 0.003 inches, 0.004 inches, or 0.005 inches greater than the outer diameter of the bar 101.

The outer diameter ($D_2$, $D_{2'}$) of each collar (102, 102') can be any size, but is typically larger than the inner diameter ($D_1$, $D_{1'}$) of each collar (102, 102') and the outer diameter of bar 101. The size of the outer diameter ($D_2$, $D_2$') of each collar can depend on the particular application and the object that is to be brought into contact with the apparatus, e.g., a spiral would element.

In some embodiments, the size of the outer diameter ($D_2$, $D_2$') can depend on the outer diameter of the bar 101. For example, the outer diameter ($D_2$, $D_2$') of each collar (102, 102') can be larger than the outer diameter of the end portions of bar 101 without the collars (102, 102'). For example, each collar (102, 102') can have an outer diameter ($D_2$, $D_2$') that is greater than the outer diameter of bar 101 such that when collars 102 and 102' are fitted over the end portions of bar 101, the outer diameter of bar 101 is effectively increased, i.e., the outer diameter of each end portion of bar 101 that is covered by collars 102 and 102' is greater than the outer diameter of the central portion of bar 101 that is not covered by a collar. In some embodiments, the outer diameter ($D_2$, $D_2$') can be between about 0.25 inches and about 2 inches larger than the outer diameter at the central portion of bar 101, such as between about 0.5 inch and about 1.5 inches larger, e.g., the size of the outer diameter ($D_2$, $D_2$') can be about 0.25, 0.3, 0.4, 0.5, 0.6, 0.7, 0.8, 0.9, 1, 1.1, 1.2, 1.3, 1.4, 1.5, 1.6, 1.7, 1.8, 1.9, or 2 inches, or more, larger than the outer diameter of the central portion of bar 101. In an exemplary embodiment, the outer diameter of the bar 101 can be constant and have an outer diameter of about 3 inches and the outer diameter ($D_2$, $D_2$') of each collar (102 and 102') can be about 4 inches, i.e., the outer diameter at the end portion of bar 101 is effectively increased by about 1 inch. Typically, the outer diameter is increased a sufficient amount to allow only the end portions of bar 101 that are covered by (or fitted with) collars 102 and 102' to come into contact with the object that pressure is being applied to, for example, a spiral wound element. The amount the outer diameter ($D_2$, $D_2$') is increased (as compared to the outer diameter of the central portion of bar 101) can be chosen so that it is large enough to avoid spacer marks on the desired object, e.g., spiral wound element, due to contact with the central portion of the bar, but small enough so as to avoid formation of indentations at the sealant lines that damage the membrane.

In some embodiments, the outer diameter ($D_2$, $D_2$') can depend on the object that is to be brought into contact with the apparatus, e.g., a spiral wound element, and the desired amount of pressure to be applied. In some embodiments, the outer diameter ($D_2$, $D_{2'}$) of each collar (102, 102') can be between about 1 inch and about 6 inches, for example, between about 2 inches and about 5 inches, such as about 4 inches, e.g., an outer diameter ($D_2$, $D_{2'}$) of about 1, 1.25, 1.5, 1.75, 2, 2.25, 2.5, 2.75, 3, 3.25, 3.5, 3.75, 4, 4.25, 4.5, 4.75, 5, 5.25, 5.5, 5.75, or 6 inches. In an exemplary embodiment, bar 101 can have an outer diameter of about 3 inches and outer diameters $D_2$ and $D_2$' of collars 102 and 102', respectively, can each be about 4 inches.

In some embodiments, the outer diameter ($D_2$, $D_2$') can depend on the thickness (T, T') of the collar (102, 102'). The thickness (T, T') is the distance between the inner diameter ($D_1$, $D_1$') and the outer diameter ($D_2$, $D_2$'). The thickness (T, T') can be any size that is sufficient to effectively increase the outer diameter at the end portions of bar 101 that are covered by collars 102 and 102' as compared to the outer diameter of the central portion of bar 101 to allow only the covered end portions of bar 101 (and not the central portion of bar 101) to come into contact with the object that pressure is being applied to, for example, a spiral wound element. In some embodiments, the thickness (T, T') of each collar (102, 102') is between about 0.1 inch and about 2 inches, such as between about 0.25 inches and about 1 inch, e.g., about 0.1, 0.25, 0.5, 0.75, 1, 1.25, 1.5, 1.75, or 2 inches.

In an exemplary embodiment, the compression bar apparatus 1 can be used to compress, or apply pressure to, the sealant, e.g., glue, lines of a spiral wound element and not come into contact with or apply pressure to the active area of the membrane. The outer diameter at the end portions of bar 101, such as when fitted with collars, e.g., collars 102 and 102' that serve to effectively increase the outer diameter of the end portions of bar 101, can be of a size such that the outer diameter ($D_2$, $D_2'$) and/or the thickness (T, T') of the collars (102, 102') effectively increases the outer diameter of the end portions of bar 101 as compared to the outer diameter of the central portion of the bar 101 enough to apply sufficient pressure to the desired area of the membrane, e.g., the glue lines, without causing damage to the active area of the membrane. For example, an outer diameter ($D_2$, $D_2'$) and/or collar thickness (T, T') that is too large (in comparison to the outer diameter of the central portion of bar 101) can result in application of excessive pressure to the membrane and damage the membrane, particularly along the sealant lines, while an outer diameter ($D_2$, $D_2'$) and/or collar thickness (T, T') that is too small (in comparison to the outer diameter of the central portion of bar 101) can result in application of an insufficient amount of pressure, resulting in inconsistent sealant line adhesion and osmotic blistering. Additionally, an outer diameter ($D_2$, $D_2'$) and/or collar thickness (T, T') that is not sufficiently larger than the outer diameter of the central portion of bar 101 may not provide enough clearance between the central portion of roller 101 and the active area of the membrane, resulting in damage to the active area of the membrane.

Collars 102 and 102' can be solid, i.e., the collar itself can be one solid piece of material, or can be hollow, i.e., the collar itself is not solid. The collars (102, 102') can be made of a rigid material. Exemplary materials include plastics, such as synthetic plastic polymers, e.g., polyvinylchloride (PVC), metals, or metal alloys. In exemplary embodiments, the edges (121, 121') of the collars (102, 102') can be rounded. In some embodiments, only one collar can be present on each end portion of bar 101. In other embodiments, more than one collar can be present on each end of roller 101. For example, one or more than one collar can be placed over another collar, i.e., stacked, to further effectively increase the outer diameter at the end portions of bar 101.

The width (W, W') of each collar (102, 102'), i.e., the length of the outer surface (122, 122') of each collar (102, 102') that covers a portion of bar 101, can be chosen based on the properties of the adhesive used in the membrane. For example, in some embodiments, the width (W, W') of each collar (102, 102') is chosen based on the viscosity of the adhesive used in the membrane. In some embodiments, the width (W, W') of each collar (102, 102') can match or exceed the spread distance of the adhesive. For example, the width (W, W') of each collar (102, 102') can be chosen to extend a certain distance from the sealant lines towards the active area of the membrane as measured when the compression bar apparatus 1 and spiral wound element 2 are brought into contact with each other, such as a distance sufficient to cover the spread distance of the sealant but not come into contact with the active area of the membrane. In some embodiments, each collar (102, 102') can extend between about 0.25 inches and 2 inches from the sealant line toward the active area of the membrane, as measured when the compression bar apparatus 1 and spiral wound element 2 are brought into contact with each other, such as between about 0.5 inches and 1.5 inches, or about 1 inch. In exemplary embodiments, the width (W, W') of each collar (102, 102') can extend about 1 inch from the sealant line toward the active area.

In some embodiments, the width (W, W') of each collar (102, 102') can be a width such that each collar covers, or fits over, between about 0.25% and 7.5% of the total length of bar 101, such as about 0.25%, 0.5%, 0.75%, 1%, 1.25%, 1.5%, 2%, 2.25%, 2.5%, 2.75%, 3%, 3.25%, 3.5%, 3.75%, 4%, 4.25%, 4.5%, 4.65%, 4.75%, 5%, 5.25%, 5.5%, 5.75%, 6%, 6.25%, 6.5%, 6.75%, or 7% of the total length of bar 101. In exemplary embodiments, the total width (W, W') of each collar (102, 102') can be between, for example, about 0.1 inches and about 3 inches, such as, e.g., about 0.1, 0.25, 0.5, 0.75, 1, 1.25, 1.5, 1.75, 2, 2.25, 2.5, 2.75, or 3 inches, or more, depending on the desired application or the properties of the adhesive used in the membrane. Typically, when the collars (102, 102') are fitted on each end of the bar 101, the width (W, W') of the outer surface (122, 122') of each collar (102, 102') is sufficient to allow contact between the collars (102, 102') and the edges of the membrane containing the sealant lines and the sealant spread while not coming into contact with the active area of the membrane. In an exemplary embodiment, the first collar (102) and the second collar (102') can each have a width (W, W', respectively) that is between about 4.5% and 5% of the total length of bar 101 and can extend between about 0.5 inches and 1.5 inches, such as about 1 inch, from the sealant lines toward the active area of the membrane when the compression bar apparatus and spiral wound element are brought into contact.

A collar (102, 102') can be fastened to bar 101 by any means that is sufficient to secure the collar (102, 102') to the bar. For example, the collars (102, 102') can be secured to bar 101, e.g., at each end portion, by applying pressure, crimping, clamping, applying adhesive, or any other means of securing the collars to the roller. In some embodiments, collars 102 and 102' are press fit, i.e., friction fit or interference fit, onto each end portion of bar 101.

In some embodiments, the outside facing edge (120, 120') of each collar (102, 102') can have an opening that permits the core 103 to extend out through the outside facing edge (120, 120') to allow connection of the bar 101 to the lifting components (200, 200'). In other embodiments, the outside facing edge (120, 120') can be configured to be the connector to the lifting component (200, 200'). For example, the outside facing edge (120, 120') can have an opening with a diameter that is at least as large as or slightly larger than the outer diameter of the core 103, such as, e.g., at least 0.5 inches or larger, to allow core 103 to fit through.

The total length of the bar 101 fitted with collars 102 and 102' typically is at least as long as the object to which the compression bar apparatus 1 described herein is applying pressure. For example, where the object is a spiral wound element, such as the spiral wound elements described herein, the total length of bar 101 fitted with collars 102 and 102' is at least the same length as the spiral wound element. In some embodiments, the total length of bar 101 fitted with collars 102 and 102' can be longer than the object, such as longer than a spiral wound element. In some embodiments, the total length of the bar 101 fitted with collars 102 and 102' is at least about 40 inches, and typically no longer than about 43 inches, such as about 40, 40.5, 41, 41.5, 42, 42.5, or 43 inches.

The compression bar apparatus described herein can include a means of moving the roller bar into the desired position. For example, the compression bar apparatus can be positioned horizontally and can include means of raising and lowering the horizontally positioned roller bar vertically into the desired position. Any means of raising and lowering the roller bar can be used, including, but not limited to, pneumatic, electromagnetic, hydraulic, other mechanical means, manual, or automated, such as by remote control means, such as by radio control, or by any other known means. In an exemplary embodiment, the roller bar can be moved, e.g., raised and lowered, by pneumatic means.

In some embodiments, means for moving the roller bar 100 can be a lifting component. As shown in FIG. 3, in an exemplary embodiment, lifting component 200 can include a rod 201, a piston 202, a pneumatic cylinder 203, a rod end 204, and mounting threads 205 and 206. Lifting component 201' can be identical and contain identical components, i.e., a rod 201', a piston 202', a pneumatic cylinder 203', a rod end 204', and mounting threads 205' and 206'. The lifting components 200 and 200' can be connected to the roller bar 100 and serve to raise and lower the horizontally positioned roller bar 100 vertically into the desired position.

As shown in FIG. 3, lifting components 200 and 200' can be connected to each end of the roller bar 100. The roller bar 100 can be positioned horizontally and perpendicular to each of lifting components 200 and 200'. In exemplary embodiments, the roller bar 100 can be axially aligned with lifting components 200 and 200'. The lifting components (200, 200') can be attached to each end of the roller bar 100 by any means suitable for attaching the lifting components (200, 200') and the roller bar 100 together that allows the roller bar 100 to be raised and lowered by the lifting components (200, 200') and to come into contact with the desired object, e.g., a spiral wound element. In exemplary embodiments, the roller bar 100 can be rotatably mounted to lifting components 200 and 200'. In an exemplary embodiment, e.g., where the roller bar 100 includes a core 103, the lifting components (200, 200') can be attached to the core 103 through rods (201, 201'). For example, rods 201 and 201' can be fixed perpendicularly to each end of core 103 through rod ends 204 and 204', respectively. The rod ends (204, 204') can be any type of rod end that is capable of joining and holding the components together. In one example, the rod ends (204, 204') are ball joint rod ends. The rod ends (204, 204') can be positioned around core 103 at any suitable distance between the end of the core 103 and the first surfaces of collars 102 and 102', respectively, that allows the roller bar 100 to spin or rotate, such as around the x-axis, when collars 102 and 102' are brought into contact with a spiral wound element, such as the spiral wound elements described herein. For example, rod ends 204 and 204' can be positioned around the core 103 equidistance between each end of the core 103 and the first surface of collars 102 and 102', respectively.

As shown in FIG. 3, in some embodiments, cylindrical rods 201 and 201' are positioned in pneumatic cylinder bodies 203 and 203', respectively, and extend vertically down from each end of the roller bar 100. The top end of each of rods 201 and 201' is connected to rod ends 204 and 204' through mounting threads 206 and 206', respectively. Mounting threads 205 and 205' extend from the bottom of the cylinder body (203, 203') and can serve to attach the compression bar apparatus 1 described herein to a fixed object, such as a table.

The rod (201, 201') and piston (202, 202') can be suitably sealed with respect to the interior of the cylinder (203, 203') such that application of pneumatic pressure to the lower portion of the cylinder (203, 203') will cause the piston (202, 202') and the rod (201, 201') to move upwardly, out of the cylinder (203, 203'). In FIG. 3, the rod is shown as being straight and made from a single tubular element such that a rod end (204, 204') may be affixed at the top end of the rod (201, 201') through a mounting thread (206, 206') that allows for attachment of core 103 perpendicular to the rod (201, 201'). Other suitable structures for forming the rod (201, 201') so as to both lift vertically out of the cylinder and include provision for affixing the core 103 will be known to those of skill in the art. The configuration shown in FIG. 3 is intended to place the rod (201, 201') in a position that extends perpendicularly from the end of the core 103 so as to avoid interference with the bar 101 fitted with collars 102 and 102' during operation, i.e., rotation of the bar 101 fitted with collars 102 and 102' around the x-axis.

In an exemplary embodiment, the pneumatic cylinder (203, 203') can be pneumatically coupled to an air source, such that actuation of the air source pressurizes the pneumatic cylinder (203, 203'), thus extending the rod (201, 201') upwards from the cylinder (203, 203'). This has the effect of raising the roller bar 100 from its lowermost position to its uppermost position. The pneumatic cylinders 203 and 203' can be supplied with air for only providing the upward force. The cylinders 203 and 203' can be supplied with air through an inlet (not pictured) and air can escape through an outlet (not pictured).

The compression bar apparatus described herein, e.g., a compression bar apparatus that can include a roller bar (100) and lifting components (200, 200'), can be mounted or attached to a fixed object, for example, a frame or a table. The compression bar apparatus can be movably mounted to a fixed object to permit movement of the apparatus, for example, lifting and lowering of the apparatus. In some embodiments, as shown in FIG. 6, the lifting components (200, 200') of the compression bar apparatus 1 can be movably mounted to a frame (400) that allows for lifting and lowering of the roller bar 100 to bring the roller bar 100 into contact with the desired object, e.g., a spiral wound element (2). In some embodiments, a structure, e.g., a table top (300), that can be used in preparing or assembling a spiral wound element, can be mounted on or attached to the frame (400).

In an exemplary embodiment, such as the rolling table assembly shown in FIG. 6, the spiral wound element 2 can be positioned horizontally between upper frames 402 and 402' through permeate collection tube 9. The compression bar apparatus, such as the compression bar apparatus 1 described herein, can be positioned directly underneath the spiral wound element 2 such that the roller bar 100 is positioned horizontally between lower frame portions 401 and 401' and lifting components 200 and 200' are positioned vertically, perpendicular to (i.e., axially aligned with) roller bar 100. As described herein, the roller bar 100 can be raised and lowered vertically by lifting components 200 and 200' to allow collars 102 and 102' to come into contact with sealant lines 6 and 6' along the edges of spiral wound element 2.

As shown in FIG. 3, in some embodiments, cylindrical rods 201 and 201' are positioned in pneumatic cylinder bodies 203 and 203', respectively, and extend vertically down from each end of the roller bar 100. The top end of each of rods 201 and 201' is connected to rod ends 204 and 204' through mounting threads 206 and 206', respectively. Mounting threads 205 and 205' extend from the bottom of the cylinder body (203, 203') and can serve to attach the compression bar apparatus 1 described herein to a fixed object, such as a table.

In an exemplary embodiment, the compression bar apparatus described herein can be used to come into contact with and apply pressure along the sealant lines of a spiral wound element while not coming into contact with the active area of the spiral wound element. The amount of pressure that can be applied can be an amount of pressure sufficient to increase the sealant or adhesive penetration between the membrane layers, increase sealant line adhesion consistency, and prevent the formation of blisters along the sealant lines (i.e., osmotic blistering). The pressure also can be an amount sufficient to minimize damage to the active area of the membrane. The amount of pressure applied by the compression bar apparatus can be chosen based on the desired application and properties of the spiral wound element. For example, the pressure should be great enough to provide sufficient pressure to the core of the element, but not so great that it leads to indentation and thus damage to the membrane. The amount of pressure applied can depend on the desired application. In exemplary embodiments, for example, the amount of pressure applied can be between about 30 pounds per square inch (psi) and about 45 psi, such as between about 35 and about 40 psi, e.g., about 30, 31, 32, 33, 34, 35, 36, 37, 38, 39, 40, 41, 42, 43, 44, or 45 psi, depending on the properties of the membrane. In some embodiments, the amount of pressure applied can depend on the diameter of the object pressure is being applied to, e.g., a spiral wound element. In an exemplary embodiment, the spiral wound element can have a diameter of between about 7 and about 8 inches, such as, e.g., about 7, 7.1, 7.2, 7.3, 7.4, 7.5, 7.6, 7.7, 7.8, 7.9, or 8 inches and the pressure applied by the compression bar apparatus can be between about 30 psi and about 45 psi, such as between about 35 psi and about 40 psi.

The application of an insufficient amount of pressure to the sealant lines of a spiral wound element can result in osmotic blistering, i.e., the formation of blisters along the sealant lines as a result of liquid accumulation between the impermeable sealant, e.g., glue, and the membrane. Conversely, the application of excessive pressure can lead to indentations and damage to the membrane, such as marks from spacer material on the active area of the membrane. Damage to the active area of the membrane, for example, spacer marks on the active area of the membrane, also can occur when the outer diameter of each end portion of the bar is too large or not large enough as compared to the outer diameter of the central portion of the bar. For example, damage can occur to the active area of the membrane when the difference in diameters is not large enough to prevent the central portion of the bar from coming into contact with the active area of the membrane, or when the difference in diameters is too large, resulting in damage to the membrane at the interface between the membrane and the roller bar.

Figure 7A:
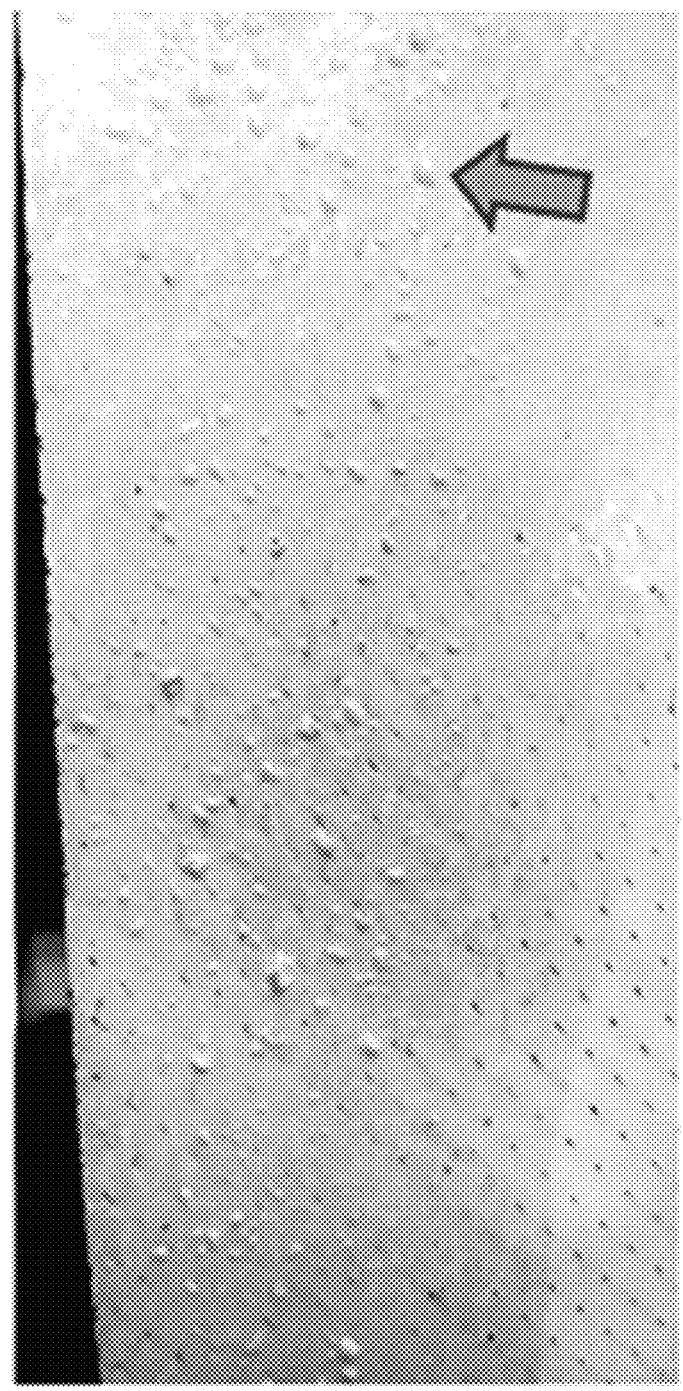
FIGS. 7A-7D illustrate membrane sheets after application of pressure by a compression bar apparatus.
Figure 7B:
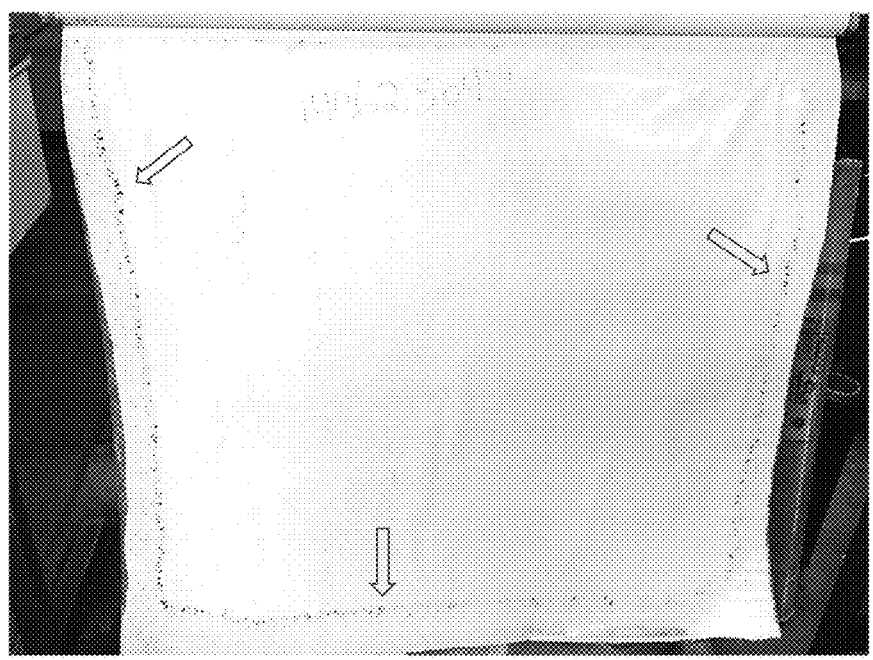
Figure 7C:
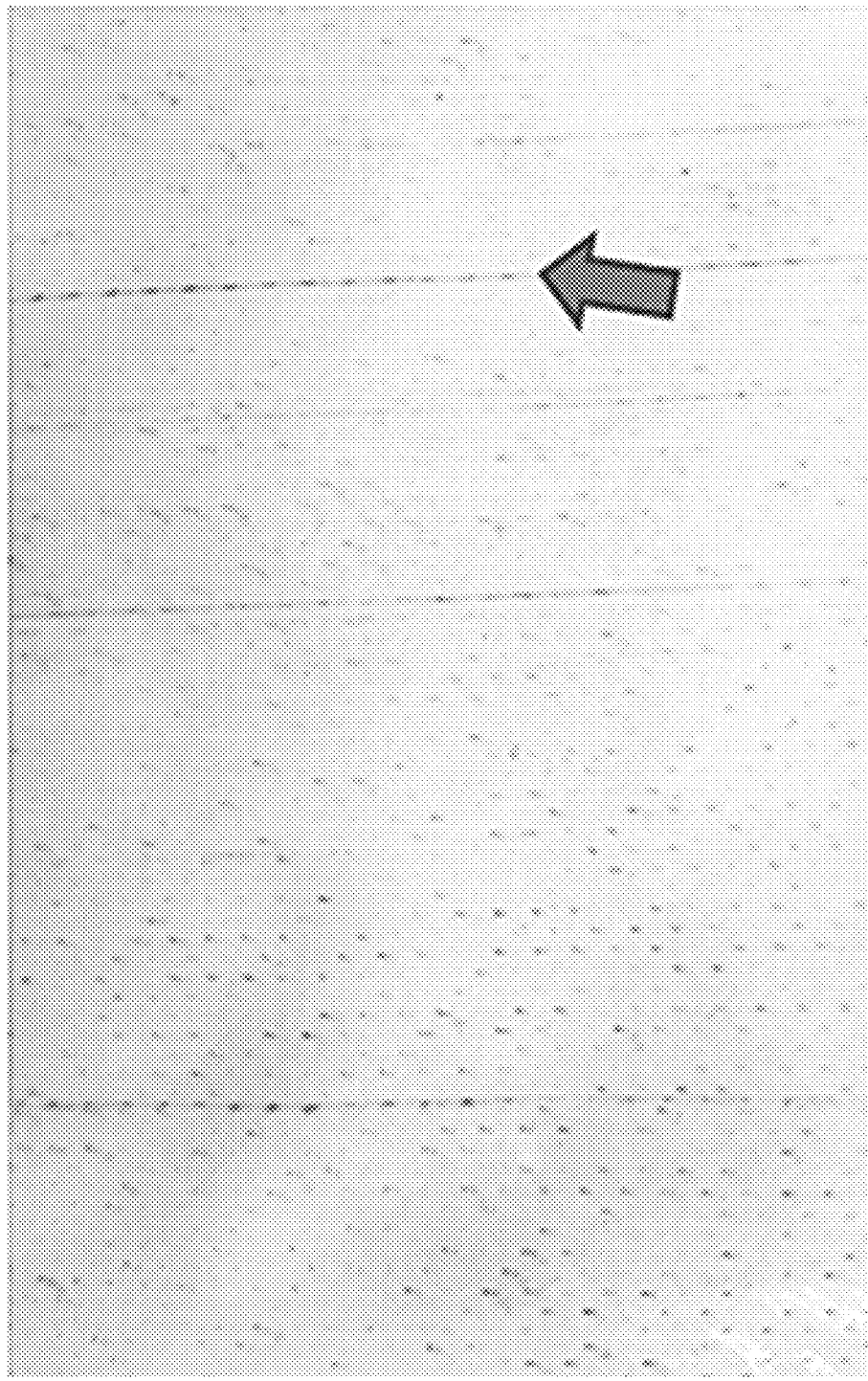
Figure 7D:
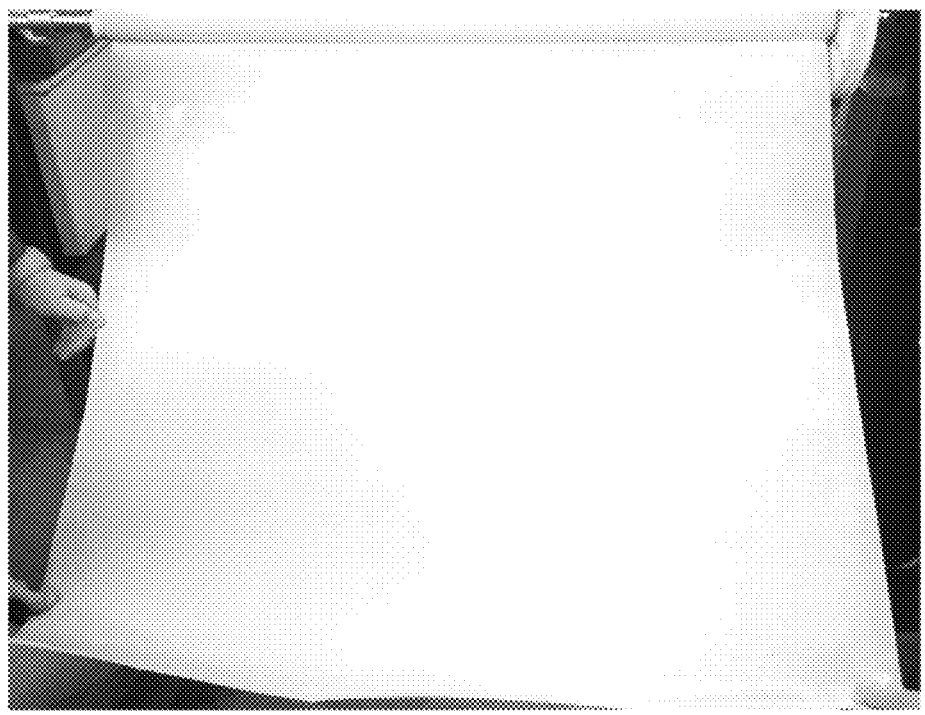

FIGS. 7A and 7B show membranes displaying osmotic blistering due to application of an insufficient amount of pressure by a compression bar, such as compression bars known in the prior art. Conversely, application of excessive pressure can cause damage to the membrane, such as shown in FIG. 7C. The membrane shown in FIG. 7C has spacer marks on the membrane resulting from the application of too much pressure. FIG. 7D shows a membrane that was used with the compression bar apparatus described herein. As can be seen by the membrane displayed in FIG. 7D, the membrane formed using the compression bar apparatus described herein does not display any blisters along the glue lines nor any damage to the active area of the membrane.

D. Methods of Using the Compression Bar Apparatus

The compression bar apparatus described herein can be used to apply pressure to any object where application of pressure to a portion of the object, but not all of the object, is desired. For example, the pressure bar apparatus provided herein can be used to apply pressure to the edges of the membrane sheets of a spiral wound element, for example, along the sealant, e.g., glue, lines, without applying pressure to the active areas of the membrane. By virtue of contact occurring only between the compression bar apparatus and the portion of the element that contains sealant, i.e., sealant lines, and the amount of pressure applied to the membrane, sealant, e.g., glue, penetration is improved and sealant, e.g., glue, line blisters are prevented or eliminated; damage to the active area of the membrane is minimized; and sealant, e.g., glue, line adhesion consistency is improved. Thus, provided herein are methods of improving sealant, e.g., glue, penetration between the membrane layers of a spiral wound element. Also provided are methods of preventing or eliminating the formation of blisters along the glue lines of a spiral wound element. Also provided are methods of minimizing damage to the active area of a spiral wound element.

Provided herein is a method of improving sealant, e.g., glue, penetration between the membrane layers of a spiral wound element and minimizing damage to the active area of a spiral wound membrane. Any spiral wound element can be used in the methods described herein. In an exemplary embodiment, the method can involve preparing a spiral wound element that contains at least two membrane sheets secured together with a sealant. For example, the membrane sheets can be sealed together along the edges of the sheets, such as along one, two, three, or four edges, with a sealant. The sealant can be any sealant that sufficiently seals the membrane sheets together, for example, urethanes, epoxies, silicones, acrylates, hot melt adhesives and UV curable adhesives. In some examples, the sealant can be a polyurethane adhesive. The sealant can be applied along the edges of the membrane sheets, leaving the interior portion, or active area, of the membrane free from sealant. For example, the sealant can be applied along the edges of the membrane sheets to form sealant lines, such as the sealant lines (6, 6', 6") depicted in FIGS. 1, 2 and 6A-6B. The two or more membrane sheets can be concentrically wound around a permeate collection tube to form a spiral wound element. In some embodiments, a permeate channel spacer sheet can be placed between two membranes before sealant is applied, thereby forming a membrane envelope. In an exemplary method, the spiral wound element can be the spiral wound element shown in FIG. 1 and FIG. 2 and described elsewhere herein.

The method further includes positioning the spiral wound element and a compression bar apparatus parallel to each other. Any compression bar apparatus that has a bar with an increased outer diameter at each end portion of the bar as compared to the outer diameter at the central portion of the bar can be used in the methods described herein, such as the compression bar apparatus described herein. The outer diameter at the end portions of the bar can be increased by, for example, between about 0.5 inches and about 3 inches as compared to the outer diameter at the central portion of the bar, e.g., the outer diameter at each end portion of the bar can be increased by about 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3 inches, or more, as compared to the outer diameter at the central portion of the bar. In one example, the outer diameter of the bar can be effectively increased at each end of the bar by fitting a collar over each end of the bar, for example, collars 102 and 102' shown in FIGS. 3, 4, 5, and 6A-6B. In an exemplary method, the compression bar apparatus can include: a cylindrical bar with an increased outer diameter at each end of the bar as compared to the outer diameter at the central portion of the bar; and a means to move the bar, such as a means to raise and lower the position of the bar. In some methods, the compression bar apparatus optionally can be attached or fixed to a stationary object, for example, the compression bar apparatus can be movably mounted to a frame. In an exemplary method, the compression bar apparatus can be the compression bar apparatus shown in FIGS. 3, 4, 5 and 6A-6B and described elsewhere herein.

The means to move the roller bar can be any means that are capable of moving the roller bar in a desired direction, such as raising and lowering the roller bar into a desired position. Any means of moving the roller bar can be used, including, but not limited to, pneumatic, electromagnetic, hydraulic, other mechanical means, manual, or automated, such as by remote control means, such as by radio control, or by any other known means. In an exemplary embodiment, the roller bar can be raised and lowered by pneumatic means, such as by using the lifting components depicted in FIGS. 3, 4, and 6A-6B and described elsewhere herein. In a particular example, lifting components 200 and 200' (shown in FIGS. 3, 4, and 6A-6B) can be attached to each end of the roller bar 100 and can be identical and each include rods (201, 201'), pistons (202, 202'), pneumatic cylinders (203, 203'), rod ends (204, 204'), and two sets of mounting threads (205, 205' and 206, 206').

Figure 6A:
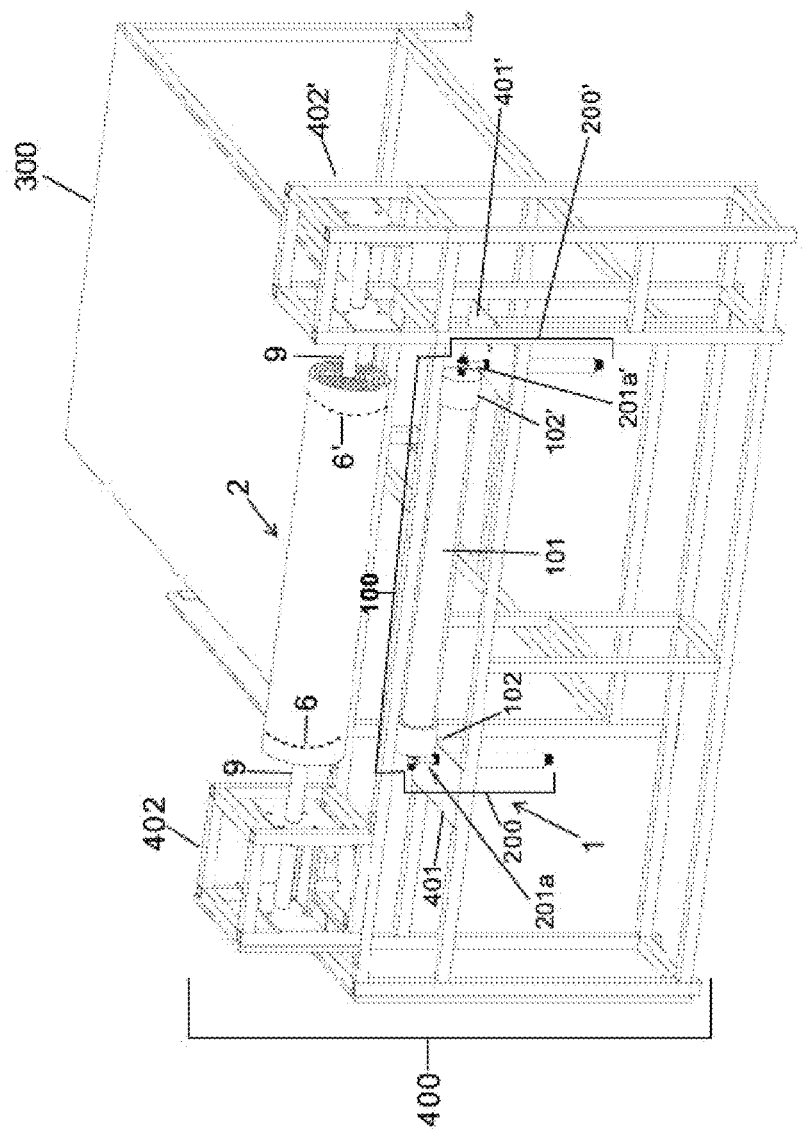
FIGS. 6A and 6B are perspective views of a rolling table assembly showing the compression bar apparatus according to the description provided herein and a spiral wound element movably mounted to a frame and table top.
Figure 6B:
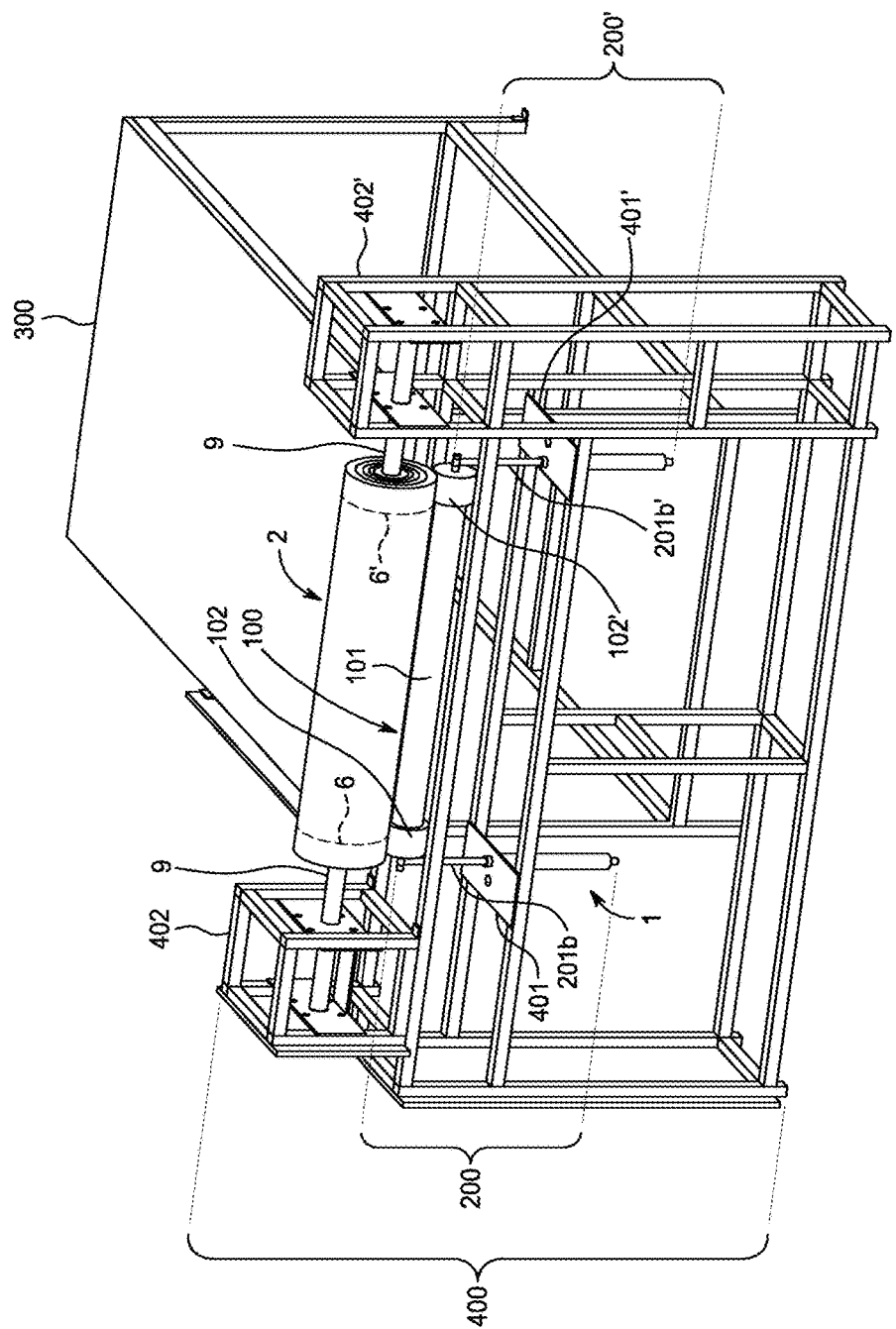

In the methods provided herein, after the compression bar apparatus and spiral wound element have been positioned so that the roller bar and element are parallel to each other, the roller bar can be moved, e.g., raised or lowered, to bring the roller bar into contact with the spiral wound element. In some embodiments, the compression bar apparatus can be positioned beneath the spiral wound element and the roller bar can be raised or lifted to come into contact with the element. In other embodiments, the apparatus can be positioned above the element and the roller bar can be lowered to come into contact with the element. In an exemplary embodiment, the roller bar is moved by lifting means, such as the lifting components 200 and 200' shown in FIGS. 3, 4, and 6A-6B. In the methods provided herein, contact between the compression bar apparatus and the spiral wound element can occur at the end portions of the roller bar, for example, only at the portions of the roller bar with an outer diameter that is increased as compared to the outer diameter at the central portion of the bar, and the portion of the spiral wound element where the sealant is located, for example, along the edges of the membrane sheets. In the methods described herein, the active area of the membrane, i.e., the portion of the membrane that does not contain sealant, does not come into contact with the compression bar apparatus. In an exemplary embodiment, such as shown in FIG. 6A-6B, the roller bar 100 can be raised from a lowered position (depicted in FIG. 6A, where rods 201a and 201a' are in the lowermost position), to an upper position (depicted in FIG. 6B, where rods 201b and 201b' are in the uppermost position). Raising the roller bar 100 from a lowered position to an upper position can bring the end portions of roller bar 100 (i.e., the end portions of the bar 100 fitted with collars 102 and 102') into contact with spiral wound element 2 along sealant lines 6 and 6' while the central portion of the bar 101 does not come into contact with the active area of spiral wound element 2 (depicted in FIG. 6B).

In the methods provided herein, the roller bar of the compression bar apparatus described herein can be moved, e.g., raised or lowered, any amount that is sufficient to bring the portion of the bar having an increased outer diameter into contact with the spiral wound element and to apply the desired amount of pressure. In some embodiments, the pressure can be applied to the portion of the spiral wound element that contains sealant, e.g., the edges of the membranes, and not to the portion of the element that does not contain sealant, e.g., the inner portion or active area of the membranes. In some examples, the amount of pressure that can be applied can be sufficient to increase the sealant, e.g., glue, penetration between the membrane layers, increase sealant, e.g., glue, line adhesion consistency, or prevent or eliminate blisters along the sealant, e.g., glue, lines. The pressure can be an amount sufficient to minimize the damage to the active area of the membrane. For example, the amount of pressure applied can be between about 30 psi and about 45 psi, such as between about 35 and about 40 psi, e.g., about 30, 31, 32, 33, 34, 35, 36, 37, 38, 39, 40, 41, 42, 43, 44, or 45 psi, depending on the properties of the element, such as the diameter of the element. In an exemplary method, the spiral wound element can have a diameter of between about 7 and about 8 inches, such as, e.g., about 7, 7.1, 7.2, 7.3, 7.4, 7.5, 7.6, 7.7, 7.8, 7.9, or 8 inches and the pressure applied by the compression bar apparatus can be between about 30 psi and about 45 psi, such as between about 35 psi and about 40 psi.

To maximize penetration of the sealant through the membrane layers, the roller bar, the spiral wound element, or both, can be rotated around its central axis (e.g., x-axis) after the roller bar and spiral wound element are brought into contact with each other. The spiral wound element, roller bar, or both, can be rotated manually or mechanically, in either a clockwise or counter-clockwise direction. In some embodiments, either the roller bar or the spiral wound element can be rotated along its central axis, e.g., manually or mechanically, causing the other component to spin. In some embodiments, the spiral wound element is rotated, e.g., spun, around its central axis (see FIG. 1), allowing the roller bar to apply uniform pressure to the portions of the spiral wound element that it is in contact with. For example, the spiral wound element 2, as shown in FIG. 6B, can be rotated around the permeate collection tube 9, allowing pressure to be applied uniformly along sealant lines 6 and 6' by bar 101 fitted with collars 102 and 102', respectively, without any contact between the central portion of bar 101 and the spiral wound element 2.

The methods provided herein can be used to produce a spiral wound element that has minimal damage to the active area of the membrane; increased sealant, e.g., glue, penetration between the membrane layers; increased sealant, e.g., glue, line adhesion consistency; and is free from blisters along the sealant, e.g., glue, lines when used in the purification of water.

To test for increased sealant penetration, a cross-section of a membrane prepared using the compression bar apparatus and methods described herein can be compared to a cross-section of the membrane of another spiral wound element prepared according to the prior art. The membranes and methods provided herein exhibit increased sealant penetration as compared to prior art membranes and methods.

Since modifications will be apparent to those of skill in the art, it is intended that this invention be limited only by the scope of the appended claims.

The invention claimed is:

1. A compression bar apparatus for applying pressure to outer edges of a spiral wound element, comprising:
   a first upper frame and a second upper frame that together support and horizontally position the spiral wound element and allow manual or mechanical rotation of the spiral wound element in a clockwise or counterclockwise direction around its central axis;
   a first lower frame positioned below the first upper frame, and a second lower frame positioned below the second upper frame, the first lower frame attached to a first lifting component and the second lower frame attached to a second lifting component;

a bar rotatably mounted to and axially aligned with each of the first and second lifting components, the bar having a uniform outer diameter along its length and having a first end portion, a second end portion, and a central portion between the first end and second end portions;

a first collar fitted over the bar at the first end portion, wherein an outer diameter of the first collar defines an outer diameter at the first end portion; and a second collar fitted over the bar at the second end portion, wherein an outer diameter of the second collar defines an outer diameter at the second end portion;

wherein:

the outer diameter at the first end portion and the outer diameter at the second end portion each is larger than the outer diameter of the bar at the central portion;

the first collar and second collar are hollow cylinders having a uniform thickness; and the first lifting component and the second lifting component together raise the bar to apply a uniform pressure to the portions of the spiral wound element that are in contact with the first collar and the second collar as the spiral wound element rotates about its axis without any contact between the central portion of the bar and the spiral wound element.

2. The apparatus of claim 1, wherein the outer diameter at the first end portion and the second end portion are the same and are between 0.25 inches and 1.25 inches larger than the outer diameter at the central portion.

3. The apparatus of claim 2, wherein the outer diameter at the central portion is between 0.5 inches and 5 inches.

4. The apparatus of claim 2, wherein the outer diameter at the first end portion and at the second end portion is the same and is between 1 inch and 6 inches.

5. The apparatus of claim 1, wherein the first collar and second collar each have a thickness of between 0.1 inches and 2 inches.

6. The apparatus of claim 1, wherein the outer diameter at the first end portion and the outer diameter at the second end portion are the same and are between 0.25 inches and 1.25 inches larger than the outer diameter at the central portion.

7. The apparatus of claim 6, wherein the outer diameter at the central portion is between 0.5 inches and 5 inches.

8. The apparatus of claim 6, wherein the outer diameter at the first end portion and the outer diameter at the second end portion are the same and are between 1 inch and 6 inches.

9. The apparatus of claim 1, wherein the first and second collars have rounded edges.

10. The apparatus of claim 1, wherein the width of the first collar and the second collar are the same and are each between 0.25% and 7.5% of the total length of the bar.

11. The apparatus of claim 10, wherein the width of the first collar and the second collar are between 0.1 inches and 3 inches.

12. The apparatus of claim 1, wherein the bar is between 40 inches and 43 inches in length.

13. The apparatus of claim 1, the bar further comprising a rigid material selected from among synthetic plastic polymers, metal, or combinations thereof.

14. The apparatus of claim 1, wherein the bar is tubular.

15. The apparatus of claim 1, further comprising a first connector for connecting the first end portion of the bar to the first lifting component and a second connector for connecting the second end portion of the bar to the second lifting component to allow rotation of the bar.

16. The apparatus of claim 1, wherein each of the first lifting component and the second lifting component comprise a rod, a piston and a cylinder.

17. The apparatus of claim 16, wherein the cylinder is a pneumatic cylinder.

18. The apparatus of claim 17, wherein the pneumatic cylinder is pneumatically coupled to an air source.

* * * * *